(12) United States Patent
Yamada et al.

(10) Patent No.: US 11,764,667 B2
(45) Date of Patent: Sep. 19, 2023

(54) SWITCHING CONTROL CIRCUIT AND POWER FACTOR CORRECTION CIRCUIT

(71) Applicant: FUJI ELECTRIC CO., LTD., Kawasaki (JP)

(72) Inventors: Ryuji Yamada, Tokyo (JP); Ryuunosuke Araumi, Tokyo (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 23 days.

(21) Appl. No.: 17/513,528

(22) Filed: Oct. 28, 2021

(65) Prior Publication Data

US 2022/0200444 A1  Jun. 23, 2022

(30) Foreign Application Priority Data

Dec. 17, 2020  (JP) ................................. 2020-209089

(51) Int. Cl.
*H02M 1/14* (2006.01)
*H02M 1/42* (2007.01)
*H02M 1/00* (2006.01)

(52) U.S. Cl.
CPC ....... *H02M 1/4225* (2013.01); *H02M 1/0025* (2021.05); *H02M 1/14* (2013.01)

(58) Field of Classification Search
CPC .... H02M 1/42; H02M 1/4208; H02M 1/4225; H02M 1/425; H02M 1/0025; H02M 1/14; H02M 7/21; H02M 7/217
See application file for complete search history.

(56) References Cited

U.S. PATENT DOCUMENTS

| | | | | |
|---|---|---|---|---|
| 5,991,172 | A * | 11/1999 | Jovanovic | ........... H02M 1/4258 363/21.14 |
| 7,266,001 | B1 * | 9/2007 | Notohamiprodjo | ..... H02M 1/42 363/59 |
| 2010/0109626 | A1 | 5/2010 | Chen | |
| 2011/0211375 | A1 * | 9/2011 | Uno | .................... H02M 1/4225 363/74 |

(Continued)

FOREIGN PATENT DOCUMENTS

JP   2010-104218 A   5/2010
JP   2012-222864 A   11/2012

(Continued)

*Primary Examiner* — Thienvu V Tran
*Assistant Examiner* — Shahzeb K Ahmad
(74) *Attorney, Agent, or Firm* — Rabin & Berdo, P.C.

(57) ABSTRACT

A switching control circuit for a power supply circuit that generates an output voltage from an AC voltage. The power supply circuit includes a rectifier circuit rectifying the AC voltage, an inductor receiving the rectified AC voltage, and a transistor controlling an inductor current flowing through the inductor. The switching control circuit controls switching of the transistor, based on the inductor current and the output voltage. The switching control circuit includes a target value output circuit that outputs a target value of a peak value of the inductor current for shaping a waveform of the peak value so as to be similar to a waveform of the rectified voltage, and a drive signal output circuit that outputs a drive signal to turn on the transistor upon the inductor current falling below a predetermined value and turn off the transistor upon the peak value of the inductor current reaching the target value.

18 Claims, 13 Drawing Sheets

(56) References Cited

U.S. PATENT DOCUMENTS

| | | | |
|---|---|---|---|
| 2011/0292704 A1* | 12/2011 | Makino | H05B 45/385 |
| | | | 363/126 |
| 2012/0250362 A1 | 10/2012 | Chen | |
| 2015/0036392 A1* | 2/2015 | Kim | H02M 3/33523 |
| | | | 363/21.16 |
| 2016/0020692 A1* | 1/2016 | Castelli | H02M 1/4208 |
| | | | 323/205 |
| 2016/0248323 A1* | 8/2016 | Gritti | H02M 1/4258 |
| 2019/0052179 A1* | 2/2019 | Bhandarkar | H02M 3/33592 |
| 2019/0068064 A1* | 2/2019 | Sonobe | H02M 1/4258 |
| 2019/0097532 A1* | 3/2019 | Yamada | H02M 1/4225 |

FOREIGN PATENT DOCUMENTS

| | | |
|---|---|---|
| JP | 2017-085865 A | 5/2017 |
| JP | 2018-064410 A | 4/2018 |
| JP | 2020-014325 A | 1/2020 |

\* cited by examiner

SWITCHING CONTROL CIRCUIT AND POWER FACTOR CORRECTION CIRCUIT

CROSS-REFERENCE TO RELATED APPLICATION

The present application claims priority pursuant to 35 U.S.C. § 119 from Japanese patent application number 2020-209089 filed on Dec. 17, 2020, the entire disclosure of which is hereby incorporated by reference herein.

BACKGROUND

Technical Field

The present disclosure relates to a switching control circuit and a power factor correction circuit.

Description of the Related Art

Switching control circuits that improve a power factor by shaping a waveform of an alternating-current (AC) voltage and a waveform of an input current so as to be similar to each other, commonly exist (for example, Japanese Patent Application Publication Nos. 2010-104218, 2020-014325, 2018-064410, 2017-085865, and 2012-222864).

Among those switching control circuits, there is such a circuit that controls a transistor such that on time thereof is constant and that causes a power supply circuit to operate in a critical mode. When such a switching control circuit is used, the power factor may decrease due to the effects of a diode and/or an inductor in the power supply circuit.

The present disclosure is directed to provision of a switching control circuit capable of correcting a power factor.

A first aspect of an embodiment of the present disclosure is a switching control circuit for a power supply circuit that generates an output voltage from an alternating-current (AC) voltage inputted thereto, the power supply circuit including a rectifier circuit configured to rectify the AC voltage, an inductor configured to receive a rectified voltage from the rectifier circuit, and a transistor configured to control an inductor current flowing through the inductor, the switching control circuit being configured to control switching of the transistor, based on the inductor current and the output voltage, the switching control circuit comprising: a target value output circuit configured to output a target value of a peak value of the inductor current, to thereby shape a waveform of the peak value so as to be similar to a waveform of the rectified voltage; and a drive signal output circuit configured to output a drive signal to turn on the transistor upon the inductor current falling below a predetermined value and turn off the transistor upon the peak value of the inductor current reaching the target value.

A second aspect of an embodiment of the present disclosure is a power factor correction circuit configured to generate an output voltage from an alternating-current (AC) voltage inputted thereto, the power factor correction circuit comprising: a rectifier circuit configured to rectify the AC voltage; an inductor configured to receive a rectified voltage from the rectifier circuit; a transistor configured to control an inductor current flowing through the inductor; and a switching control circuit configured to control switching of the transistor, based on the inductor current and the output voltage, the switching control circuit including a target value output circuit configured to output a target value of a peak value of the inductor current, to thereby shape a waveform of the peak value so as to be similar to a waveform of the rectified voltage, and a drive signal output circuit configured to output a drive signal to turn on the transistor upon the inductor current falling below a predetermined value and turn off the transistor upon the peak value of the inductor current reaching the target value.

A third aspect of the present disclosure is a switching control circuit for a power supply circuit that generates an output voltage from an alternating-current (AC) voltage inputted thereto, the power supply circuit including a rectifier circuit configured to rectify the AC voltage, an inductor configured to receive a rectified voltage from the rectifier circuit, and a transistor configured to control an inductor current flowing through the inductor, the switching control circuit being configured to control switching of the transistor, based on the inductor current and the output voltage, the switching control circuit comprising: a target value output circuit configured to output a target value of a peak value of the inductor current; and a drive signal output circuit configured to output a drive signal to turn on the transistor upon the inductor current falling below a predetermined value and turn off the transistor upon the peak value of the inductor current reaching the target value, wherein the target value has a same cycle and a same phase as those of the AC voltage, respectively, and amplitudes of the target value and the AC voltage have a proportional relationship.

BRIEF DESCRIPTION OF THE DRAWINGS

FIG. 2 is a diagram illustrating a configuration of a power factor correction integrated circuit (IC) 25a.

FIG. 3 is a diagram illustrating a configuration of a switching control circuit 42a.

DETAILED DESCRIPTION

At least following matters will become apparent from the descriptions of the present specification and the accompanying drawings.

Embodiments

Figure 1:
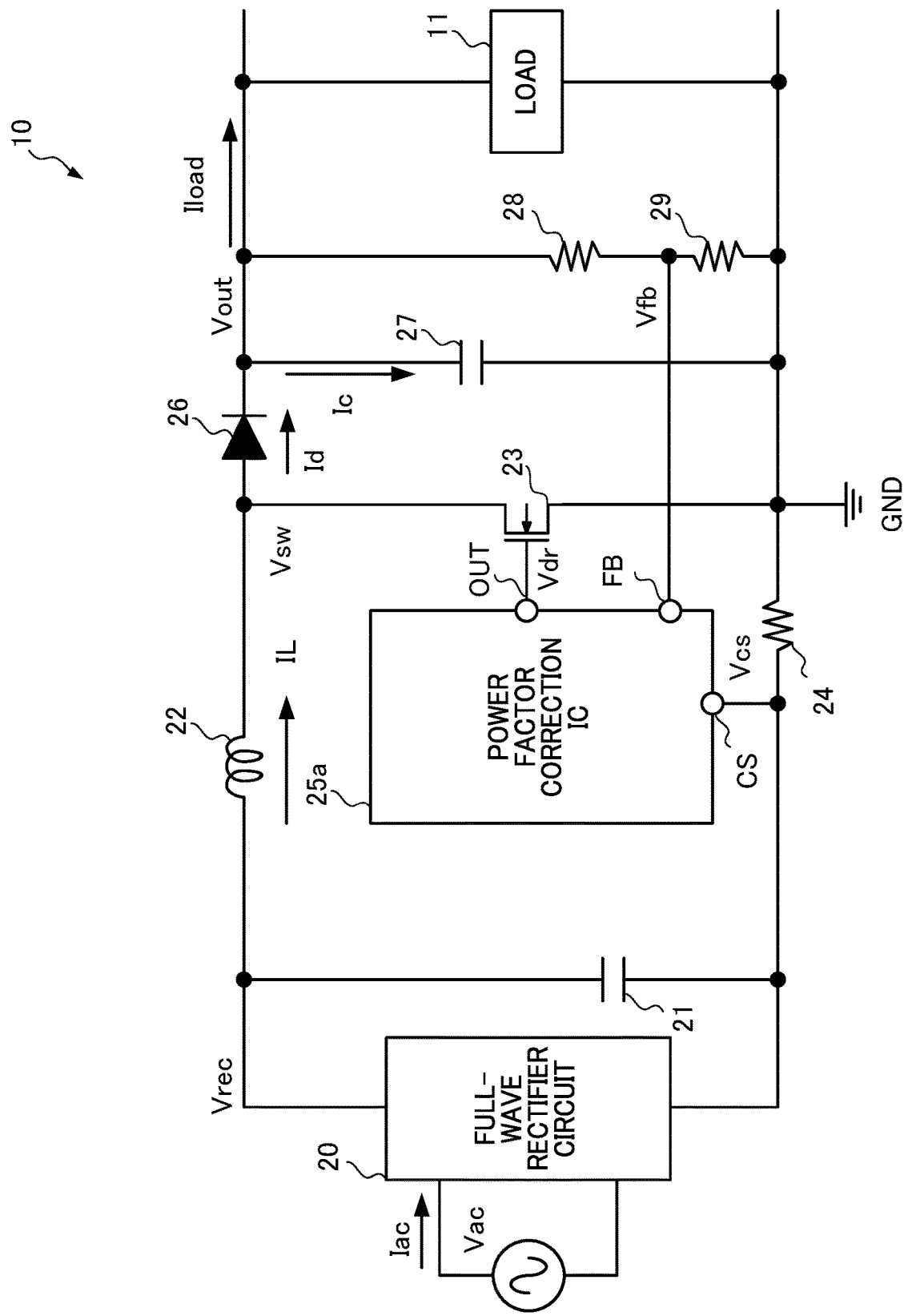
FIG. 1 is a diagram illustrating an example of an AC-DC converter 10.

FIG. 1 is a diagram illustrating an example of a configuration of an AC-DC converter 10, which is one embodiment of the present disclosure. The AC-DC converter 10 is a boost chopper type power supply circuit that generates an output voltage Vout of a target level from an alternating-current (AC) voltage Vac of commercial power supply. Note that the AC-DC converter 10 applies the output voltage Vout to a load 11 to supply power, and passes a current Iload. Moreover, although details will be described later, the AC-DC converter 10 operates as a power factor correction circuit that operates in a critical mode or a discontinuous mode. Here, the "critical mode" is a mode in which switching is turned on upon an inductor current IL, which will be described later, reaching zero. Moreover, the "discontinuous mode" is a mode in which the inductor current IL intermittently flows, in other words, an intermittent mode in which each switching cycle includes a period of time in which the inductor current IL reaches zero.

The AC-DC converter 10 includes a full-wave rectifier circuit 20, capacitors 21 and 27, an inductor 22, an NMOS transistor 23, resistors 24, 28, and 29, a power factor correction integrated circuit (IC) 25, and a diode 26.

The full-wave rectifier circuit 20 full-wave rectifies a predetermined alternating-current (AC) voltage Vac inputted thereto, and applies a resultant voltage to the capacitor 21 and the inductor 22, as an input voltage Vrec. Note that the AC voltage Vac is, for example, a voltage with an effective value of 140 to 240 V and a frequency of 50 to 60 Hz. In an embodiment of the present disclosure, the voltages described below each are basically a potential difference relative to a reference point (GND in FIG. 1), however, the AC voltage Vac refers to a voltage between terminals.

The capacitor 21 smooths the input voltage Vrec, and the capacitor 27 configures a boost chopper circuit together with the inductor 22, the NMOS transistor 23, and the diode 26. Accordingly, a charge voltage of the capacitor 27 is a direct-current (DC) output voltage Vout. Note that a current flowing through the diode 26 is referred to as current Id and a current flowing through the capacitor 27 is referred to as charge current Ic.

The NMOS transistor 23 is a switching device to control power to the load 11 of the AC-DC converter 10. Although the NMOS transistor 23 is an N-type metal oxide semiconductor (MOS) transistor in an embodiment of the present disclosure, the transistor 23 may be, for example, a bipolar transistor or the like. Furthermore, a gate electrode of the NMOS transistor 23 is coupled to a terminal OUT of the power factor correction IC 25.

The resistor 24 detects an inductor current IL flowing through the inductor 22 upon turning on of the NMOS transistor 23. The resistor 24 has one end coupled to a source electrode of the NMOS transistor 23 and the other end coupled to a terminal CS of the power factor correction IC 25.

The power factor correction IC 25 is an integrated circuit that controls switching of the NMOS transistor 23 such that the level of the output voltage Vout reaches the target level (for example, 400 V) while improving the power factor of the AC-DC converter 10. Specifically, the power factor correction IC 25 drives the NMOS transistor 23 based on the inductor current IL and the output voltage Vout. Although details of the power factor correction IC 25 will be described later, the power factor correction IC 25 has terminals CS, FB, and OUT. Note that, in an embodiment of the present disclosure, terminals other than the terminals CS and the like of the power factor correction IC 25 are omitted for the sake of convenience.

The resistors 28 and 29 configure a voltage divider circuit that divides the output voltage Vout, and generates a feedback voltage Vfb in switching the NMOS transistor 23. Note that the feedback voltage Vfb is generated at a node to which the resistors 28 and 29 are coupled, and is applied to the terminal FB.

<<<Power Factor Correction IC 25>>>
==Configuration of Power Factor Correction IC 25a==

Figure 2:
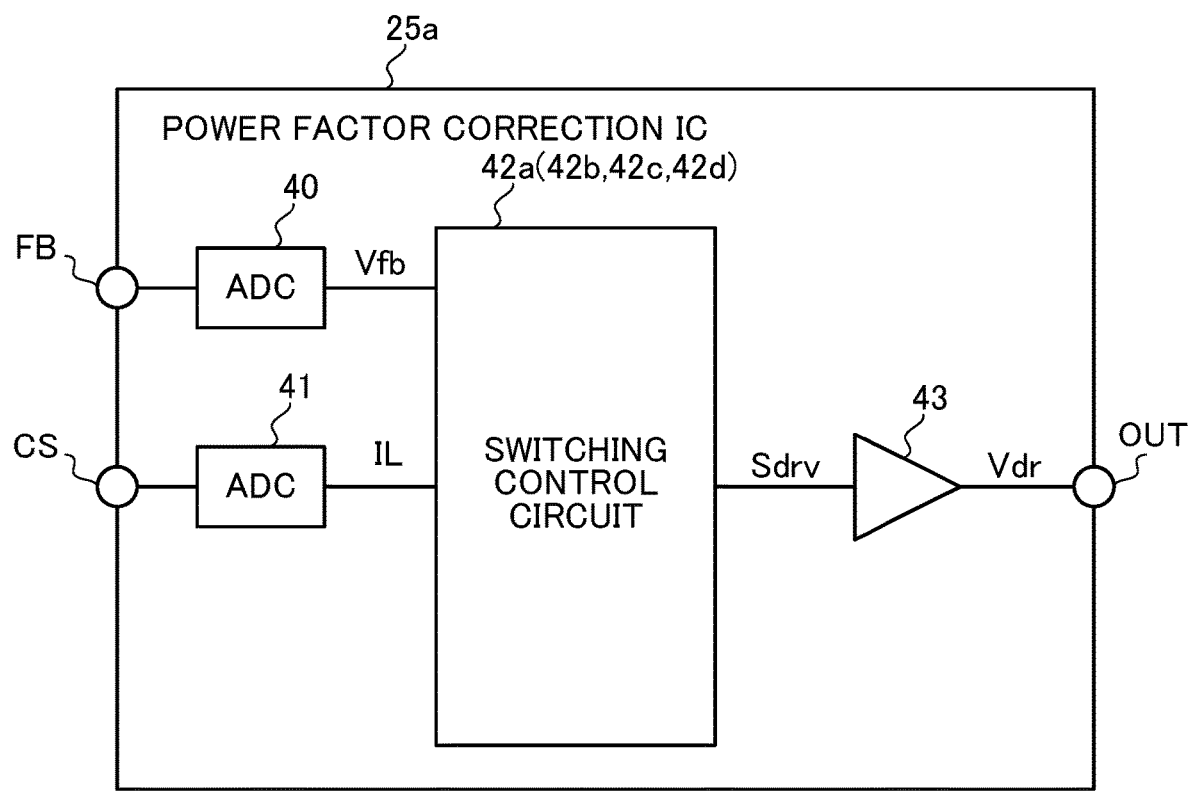

FIG. 2 is a diagram illustrating a configuration of a power factor correction IC 25a, which is one embodiment of the power factor correction IC 25. The power factor correction IC 25a includes analog-to-digital converters (AD converters, ADCs) 40 and 41, a switching control circuit 42, and a buffer circuit 43.

The AD converter 40 converts the feedback voltage Vfb to a digital value, and the AD converter 41 converts a voltage indicating the inductor current IL to a digital value. The voltage indicating the inductor current IL is detected at the resistor 24, and the polarity thereof is inverted by a level-shifter circuit (not illustrate). Note that, in an embodiment of the present disclosure, the feedback voltage Vfb converted to a digital value is referred to as feedback voltage Vfb for the sake of convenience. Similarly, the signal indicating the inductor current IL converted to a digital value that is to be processed in the switching control circuit 42 is referred to as inductor current IL for the sake of convenience.

The switching control circuit 42 outputs a drive signal Sdrv based on the feedback voltage Vfb and the inductor current IL.

The buffer circuit 43 amplifies the drive signal Sdrv and outputs a voltage Vdr for driving the NMOS transistor 23.
==Switching Control Circuit 42a==

Figure 3:
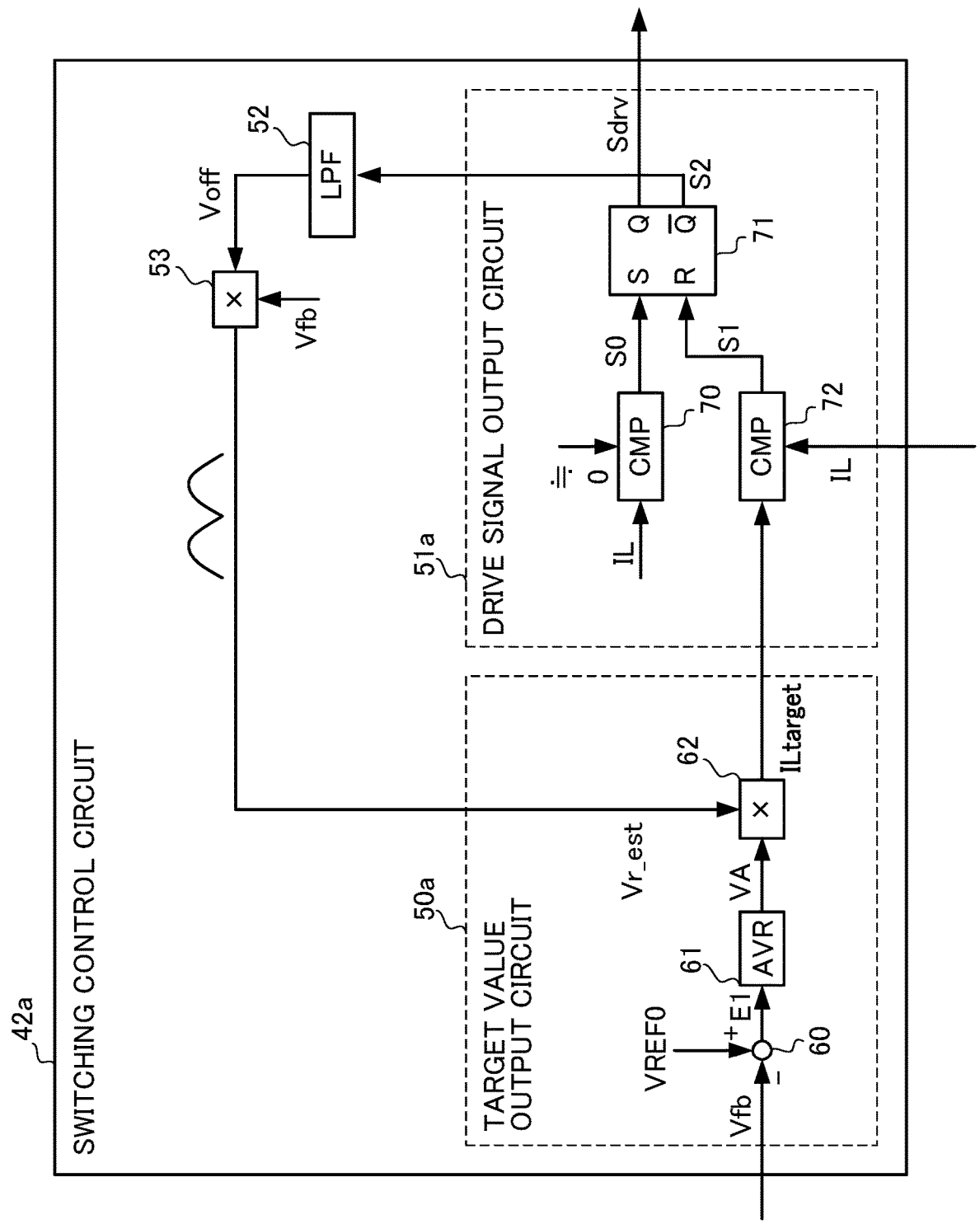

FIG. 3 is a diagram illustrating a configuration of a switching control circuit 42a, which is one embodiment of the switching control circuit 42. The switching control circuit 42a outputs the drive signal Sdrv based on the feedback voltage Vfb and the inductor current IL.

The switching control circuit 42a includes a target value output circuit 50a, a drive signal output circuit 51a, a low-pass filter (LPF) 52, and a multiplier 53.

The target value output circuit 50a outputs a target value ILtarget, to thereby shape a waveform of a peak value of the inductor current IL to be similar to a waveform of the rectified voltage Vrec.

Specifically, when the feedback voltage Vfb rises and exceeds a reference voltage VREF0 which is a reference of the output voltage Vout of the target level, the target value output circuit 50a outputs a low target value ILtarget. Meanwhile, when the feedback voltage Vfb decreases and drops below the reference voltage VREF0, the target value output circuit 50a outputs a high target value ILtarget.

The target value output circuit 50a includes a subtractor 60, a voltage regulator (Automatic Voltage Regulator: AVR) 61, and a multiplier 62.

The subtractor 60 subtracts the feedback voltage Vfb from the reference voltage VREF0, and calculates an error E1 between the reference voltage VREF0 and the feedback voltage Vfb.

The voltage regulator 61 outputs a command voltage VA for causing the level of the feedback voltage Vfb to reach the level of the reference voltage VREF0, in response to the error E1. Note that the subtractor 60 and the voltage regulator 61 correspond to, for example, a so-called error amplifier circuit that performs amplification, integration, and the like of the error E1.

The multiplier 62 multiples the command voltage VA and an estimation value Vr_est of the rectified voltage Vrec from the later-described multiplier 53, and outputs a multiplication result as the target value ILtarget of the inductor current IL. Specifically, the multiplier 62 multiplies the command voltage VA that fluctuates based on fluctuation of the output voltage Vout by a component of the estimation value Vr_est, and outputs the target value ILtarget.

The target value output circuit 50a thus reduces or increases the target value ILtarget of the inductor current IL with a rise or a drop in the output voltage Vout, so as to maintain the output voltage Vout at a target level, and outputs the resultant target value ILtarget to control the inductor current IL.

This shapes a waveform of a mean value ILmean of the inductor current IL so as to be similar to the waveform of the rectified voltage Vrec, and thus the switching control circuit 42 improves the power factor. In other words, a waveform of an input current Iac is also shaped to be similar to a waveform of the AC voltage Vac, thereby improving the power factor of the AC-DC converter 10. Note that the target value output circuit 50a outputs a reference voltage indicating the target value ILtarget, as the target value ILtarget. Accordingly, the target value ILtarget has the same phase and cycle as those of the rectified voltage Vrec, and the amplitudes of the target value ILtarget and the rectified voltage Vrec have a proportional relationship.

The drive signal output circuit 51a outputs the drive signal Sdrv for turning on and off the NMOS transistor 23 based on the inductor current IL. Specifically, the drive signal output circuit 51a outputs the drive signal Sdrv to turn on the NMOS transistor 23 upon the inductor current IL falling below a predetermined value and to turn off the NMOS transistor 23 upon the peak value of the inductor current IL reaching the target value ILtarget.

The drive signal output circuit 51a includes comparators (CMPs) 70 and 72, and an SR flip-flop 71.

The comparator 70 detects that the inductor current IL falls below the predetermined value. Specifically, the comparator 70 outputs a high-level (hereinafter, referred to as high or high level) signal S0 when the inductor current IL reaches the predetermined value (for example, substantially zero). Meanwhile, the comparator 70 outputs a low-level (hereinafter, referred to as low or low level) signal S0 when the inductor current IL not reach the predetermined value. Note that the phrase "when the inductor current IL reaches the predetermined value" also includes a state "after the inductor current IL reaches the predetermined value".

The SR flip-flop 71 outputs the drive signal Sdrv in response to the signals S0 and S1 from the comparators 70 and 72, respectively. Specifically, the SR flip-flop 71 outputs a high drive signal Sdrv upon the comparator 70 outputting the high signal S0, and outputs a low drive signal Sdrv upon the later-described comparator 72 outputting a high signal S1.

Meanwhile, when both of the comparators 70 and 72 output the low signals S0 and S1, the SR flip-flop 71 does not change the logic level of the drive signal Sdrv. Note that the NMOS transistor 23 is on when the drive signal Sdrv is high, and is off when the drive signal Sdrv is low.

The comparator 72 detects that the peak value of the inductor current IL reaches the target value ILtarget. Specifically, when the peak value of the inductor current IL reaches the target value ILtarget, the comparator 72 outputs the high signal S1. Meanwhile, when the peak value of the inductor current IL is lower than the target value ILtarget, the comparator 72 outputs the low signal S1.

As described above, the drive signal output circuit 51a outputs the drive signal Sdrv such that the AC-DC converter 10 operates in the critical mode.

The low-pass filter (LPF) 52 integrates the drive signal Sdrv over a period of time during which the NMOS transistor 23 is off, in response to a signal S2 having a logic level opposite to that of the drive signal Sdrv, and outputs an off voltage Voff. In an embodiment of the present disclosure, the estimation value Vr_est from the multiplier 53, which will be described later, is inputted to the multiplier 62, however, the off voltage Voff from the LPF 52 may be inputted to the multiplier 62. In other words, the off voltage Voff can also be used as the estimation value of the rectified voltage Vrec.

The multiplier 53 multiplies the off voltage Voff and the feedback voltage Vfb and outputs the estimation value Vr_est obtained by removing a ripple component of the off voltage Voff. Note that the reason why the ripple component of the off voltage Voff can be removed in the multiplier 53 will be described later. In addition, the LPF 52 corresponds to an "estimation circuit" or an "integration circuit", and the multiplier 53 corresponds to a "removal circuit".

<<<Method of Estimating Estimation Value Vr_est>>>

Figure 4:
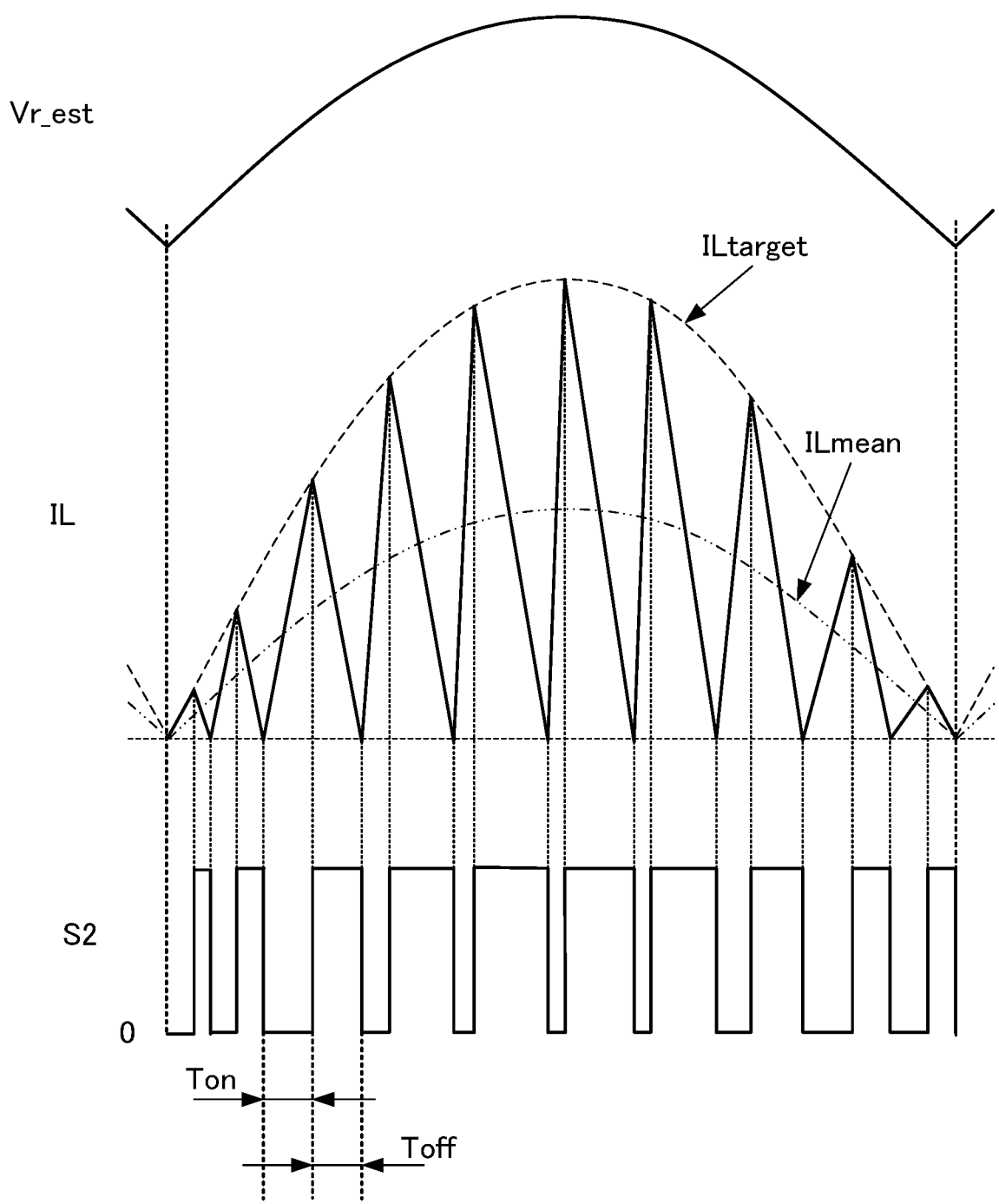
FIG. 4 is a diagram for explaining a method of estimating an estimation value Vr_est.

FIG. 4 is a diagram for explaining a method of estimating the estimation value Vr_est. In FIG. 4, the inductor current IL is given by a solid line, the target value ILtarget is given by a broken line, and the mean value ILmean of the inductor current IL is given by a dashed two-dotted line. Furthermore, the signal S2 is a signal that has a logic level opposite to the logic level of the drive signal Sdrv, and is outputted from an inversion output of the SR flip-flop 71.

Accordingly, a period of time during which the signal S2 is low is an ON period Ton during which the NMOS transistor 23 is on, and a period of time during which the signal S2 is high is an off period Toff during which the NMOS transistor 23 is off.

First, the ON period Ton and the off period Toff will be described. When the inductor current IL reaches the predetermined value, the SR flip-flop 71 outputs the high drive signal Sdrv and the ON period Ton starts. Then, when the inductor current IL reaches the target value ILtarget, the SR flip-flop 71 outputs the low drive signal Sdrv and the off period Toff starts. Thereafter, when the inductor current IL reaches the predetermined value, the SR flip-flop 71 outputs the high drive signal Sdrv and the ON period Ton starts again. This operation continues from this point forward.

In this case, the following relationship is established among the target value ILtarget, the inductance value L, the rectified voltage Vrec, the ON period Ton, the off period Toff, and the output voltage Vout:

$$IL\text{target} = V\text{rec}/L \times T\text{on} = (V\text{out} - V\text{rec})/L \times T\text{off} \quad (1)$$

where L is the inductance value of the inductor 22.

The ON period Ton and a switching cycle obtained by adding up the ON period Ton and the off period Toff can be expressed by the following formulae, based on the formula (1).

$$T\text{on} = (V\text{out} - V\text{rec})/V\text{rec} \times T\text{off} \quad (2)$$

$$T\text{on} + T\text{off} = V\text{out}/V\text{rec} \times T\text{off} \quad (3)$$

Accordingly, an off duty α expressed by Toff/(Ton+Toff) can be expressed by the following formula, based on the formulae (2) and (3).

$$\alpha = V\text{rec}/V\text{out} \quad (4)$$

Furthermore, since α<1 and the rectified voltage Vrec is lower than the output voltage Vout in the AC-DC converter 10, the formula (4) holds in any case in an embodiment of the present disclosure.

Moreover, assuming that the output voltage Vout is constant, the formula (4) expresses that the off duty a contains an AC component of the rectified voltage Vrec. Accordingly, if the off duty a can be obtained, it is possible to estimate the estimation value Vr_est of the rectified voltage Vrec.

Furthermore, the off duty a is obtained as the off voltage Voff which is obtained by smoothing or integrating the signal S2 in the LPF 52, and the off voltage Voff results in the estimation value of the rectified voltage Vrec. However, the output voltage Vout contains the ripple component that is based on the AC component of the AC voltage Vac as will be described later, and thus the off voltage Voff also contains the ripple component.

Accordingly, the multiplier 53 multiplies the off voltage Voff and the feedback voltage Vfb containing the ripple component of the output voltage Vout, to thereby remove the ripple component of the off voltage Voff, and outputs a resultant voltage as the estimation value Vr_est. Then, the target value output circuit 50*a* outputs the target value ILtarget based on the estimation value Vr_est in which the ripple component has been removed.

<<<Ripple Component of Output Voltage Vout>>>

Figure 5:
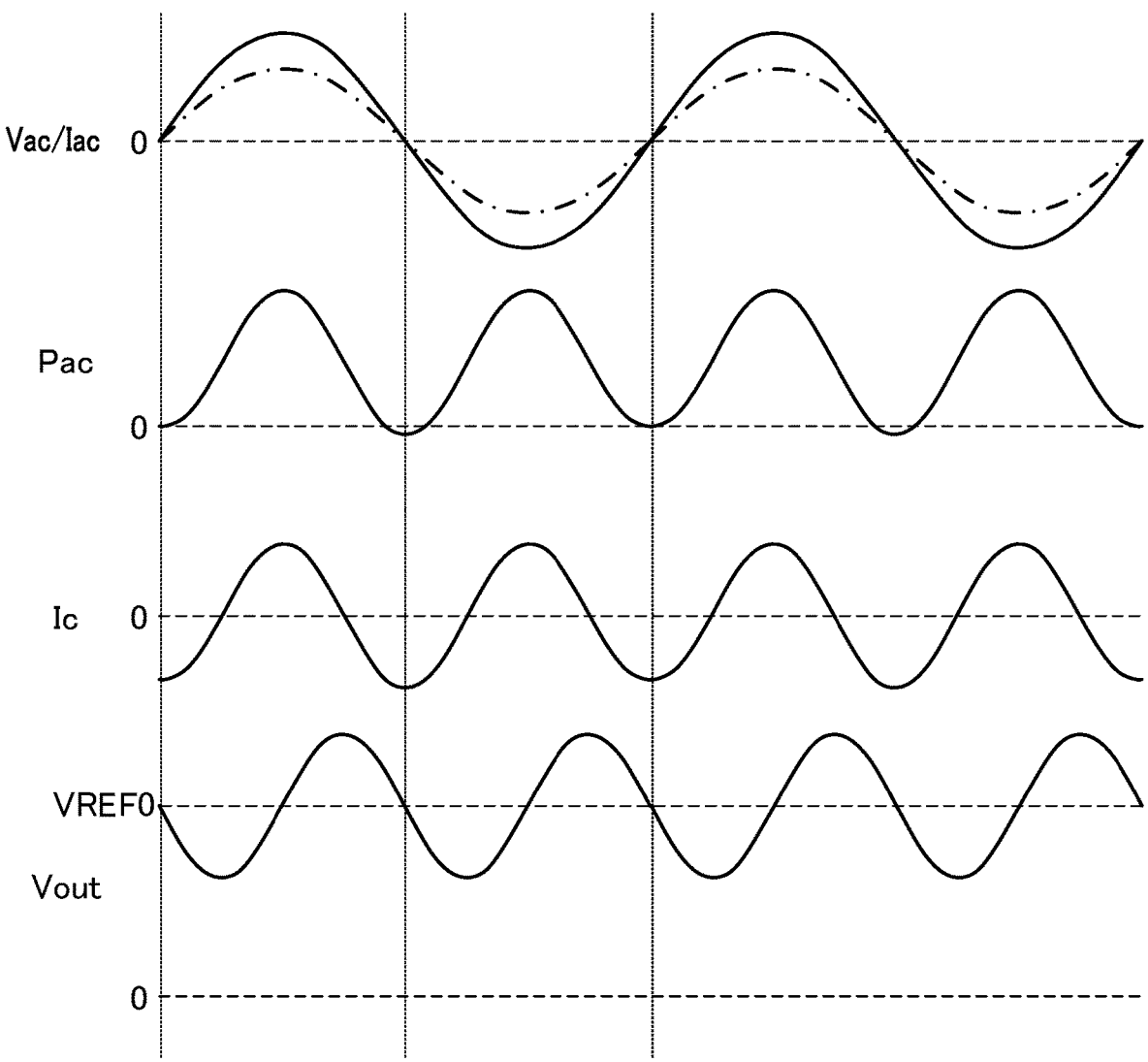
FIG. 5 is a diagram explaining principles of generation of a ripple component in an output voltage Vout.

FIG. 5 is a diagram explaining principles of generation of the ripple component in the output voltage Vout. Note that a solid line given in Vac/Iac is the AC voltage Vac and a dashed-dotted line given in Vac/Iac is the input current Iac.

First, the AC voltage Vac, the input current Iac, and input power Pac can be expressed as follows:

$$Vac = V\sin\theta \quad (5)$$

$$Iac = I\sin\theta \quad (6)$$

$$Pac = Vac \times Iac = VI\sin^2\theta \quad (7)$$
$$= VI/2 - VI/2 \times \cos2\theta$$

where V is the amplitude of the AC voltage Vac, and I is the amplitude of the input current Iac.

When the current flowing through the diode 26 of the AC-DC converter 10 is the current Id, the current Id can be expressed as follows by using the output voltage Vout.

$$Id = Pac/Vout \quad (8)$$
$$= VI/2/Vout - VI/2/Vout \times \cos2\theta$$

In this case, when the first term of the formula (8) is a DC component, in other words, the load current Iload, the charge current Ic can be expressed as follows.

$$Ic = -VI/2/Vout \times \cos2\theta \quad (9)$$

A ripple component ΔVout of the output voltage Vout is obtained by integrating the current Ic and dividing the integrated current Ic by a capacitance value C of the capacitor 27 and can be expressed as follows.

$$\Delta Vout = -VI/4/Vout/C \times \sin2\theta \quad (10)$$

Accordingly, the ripple component ΔVout fluctuates at a frequency twice the frequency of the AC voltage Vac and the amplitude of the ripple component ΔVout is inversely proportional to the capacitance value C.

<<<Relationship Between Output Voltage Vout and Pulse Width>>>

Figure 6:
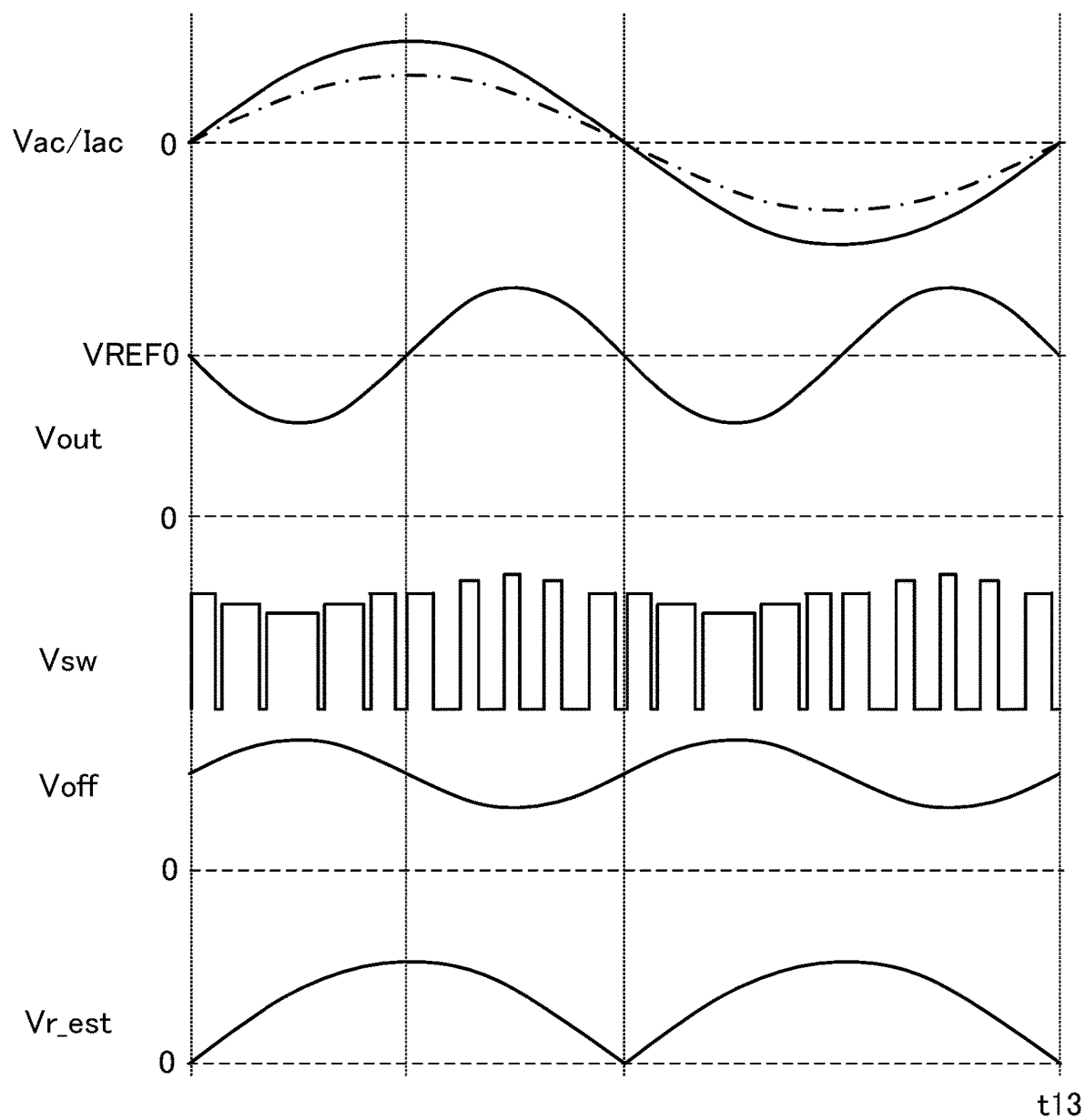
FIG. 6 is a diagram explaining a relationship between an output voltage Vout and a pulse width.

FIG. 6 is a diagram explaining a relationship between the output voltage Vout and a pulse width. Note that the relationship among the AC voltage Vac, the input current Iac, and the output voltage Vout is the same as that in FIG. 5. In addition, a voltage at a coupling point between the inductor 22 and the NMOS transistor 23 is referred to as voltage Vsw. The voltage Vsw is a ground voltage when the NMOS transistor 23 is on, and is a voltage corresponding to the output voltage Vout when the NMOS transistor 23 is off.

Moreover, the target value ILtarget can be expressed as follows based on the formula (1).

$$ILtarget = (Vout - Vrec)/L \times Toff \quad (11)$$

The off period Toff can be expressed as follows by modifying the formula (11).

$$Toff = ILtarget \times L/(Vout - Vrec) \quad (12)$$

Assuming that the target value ILtarget and the rectified voltage Vrec are predetermined values in a certain switching cycle, it is understood from the formula (12) that the higher the output voltage Vout is, the shorter the off period Toff is. Accordingly, the pulse width of the voltage Vsw changes as given in FIG. 6, in consideration of the ripple component ΔVout of the output voltage Vout.

Moreover, when the inductor current IL is maintained within a certain range by virtue of the target value ILtarget, the rectified voltage Vrec is substantially equal to a mean value of the voltage Vsw. This is due to the following reason. When the rectified voltage Vrec is higher than the mean value of the voltage Vsw, the inductor current IL unlimitedly increases. Meanwhile, when the rectified voltage Vrec is lower than the mean value, the inductor current IL does not flow.

In other words, in an embodiment of the present disclosure, considering that the inductor current IL flows while being restricted by the target value ILtarget, it can be said that the rectified voltage Vrec is substantially equal to the mean value of the voltage Vsw. Moreover, the rectified voltage Vrec, in other words, the mean value of the voltage Vsw, is proportional to a product of the pulse width of the voltage Vsw and the output voltage Vout.

Moreover, the pulse width of the voltage Vsw is the same as a pulse width of the signal S2 from the SR flip-flop 71. In addition, the off voltage Voff from the LPF 52 which is obtained by smoothing or integrating the signal S2 as described above rises when the ripple component ΔVout of the output voltage Vout is negative, and drops when the ripple component ΔVout of the output voltage Vout is positive.

Accordingly, in the multiplier 53, the estimation value Vr_est obtained by multiplying the off voltage Voff and the feedback voltage Vfb corresponding to the output voltage Vout results in the voltage in which the ripple component ΔVout of the output voltage Vout has been removed.

==Switching Control Circuit 42*b*==

Figure 7:
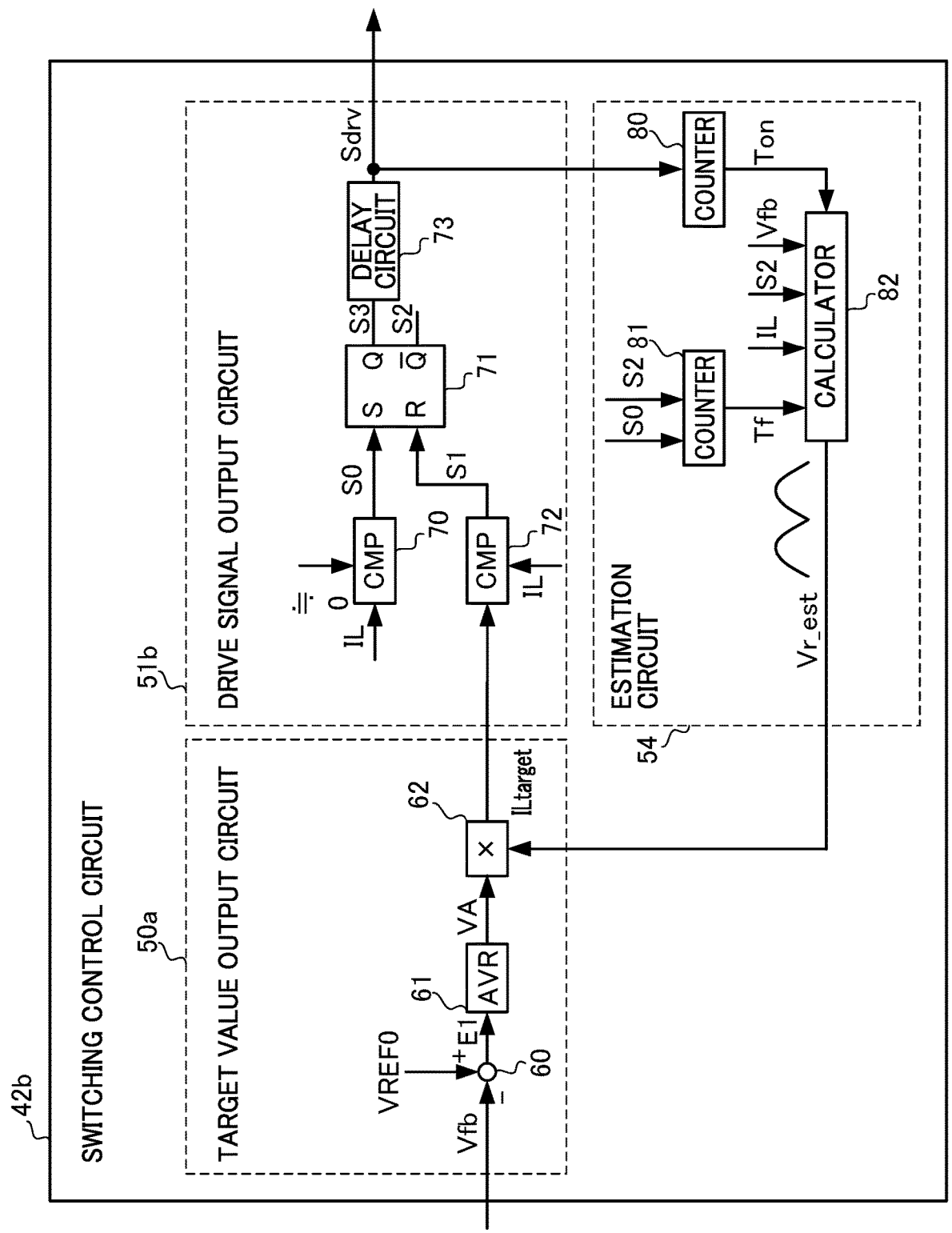
FIG. 7 is a diagram illustrating a configuration of a switching control circuit 42b.

FIG. 7 is a diagram illustrating a configuration of the switching control circuit 42*b*, which is one embodiment of the switching control circuit 42. Note that, in FIG. 7, parts or elements that are the same as those illustrated in FIG. 3 are given the same reference numerals, and a detailed description thereof is omitted.

After turning-off of the NMOS transistor 23, the switching control circuit 42*b* turns on the NMOS transistor 23 so as to reduce switching loss of the NMOS transistor 23 by using quasi-resonance occurring between the inductor 22 and a parasitic capacitance. Specifically, when a predetermined period of time has elapsed since the inductor current IL has reached the predetermined value, and the voltage Vsw, which is a drain-source voltage of the NMOS transistor 23, decreases due to the quasi-resonance, the switching control circuit 42b turns on the NMOS transistor 23.

The switching control circuit 42b includes the target value output circuit 50a, a drive signal output circuit 51b, and an estimation circuit 54.

The drive signal output circuit 51b includes the comparators (CMPs) 70 and 72, the SR flip-flop 71, and a delay circuit 73.

The delay circuit 73 turns on the NMOS transistor 23 when a predetermined period of time has elapsed since the inductor current IL has fallen below the predetermined value. Specifically, the delay circuit 73 outputs the high drive signal Sdrv for turning on the NMOS transistor 23, after the predetermined period of time has elapsed since the SR flip-flop 71 has outputted the high signal S3 for turning on the NMOS transistor 23.

The estimation circuit 54 estimates the estimation value Vr_est of the rectified voltage Vrec based on the signal from the drive signal output circuit 51b, the inductor current IL, and the feedback voltage Vfb. Specifically, the estimation circuit 54 calculates the ON period Ton and a fall period Tf, and estimates the estimation value Vr_est by using the ON period Ton and the fall period Tf together with the inductor current IL and the feedback voltage Vfb. The estimation circuit 54 includes counters 80 and 81, and a calculator 82.

The counter 80 calculates a period of time during which the drive signal Sdrv outputted from the delay circuit 73 is high, as the ON period Ton.

The counter 81 calculates a period of time from when the inductor current IL reaches the target value ILtarget to when the inductor current IL reaches the predetermined value, as the fall period Tf, in response to the signals S0 and S2.

The calculator 82 estimates the estimation value Vr_est based on the ON period Ton, the fall period Tf, the inductor current IL, and the feedback voltage Vfb. Note that a method by which the calculator 82 estimates the estimation value Vr_est will be described later. In addition, the ON period Ton corresponds to a "first period", and the fall period Tf corresponds to a "second period".

<<<Method of Estimating Estimation Value Vr_est>>>

Figure 8:
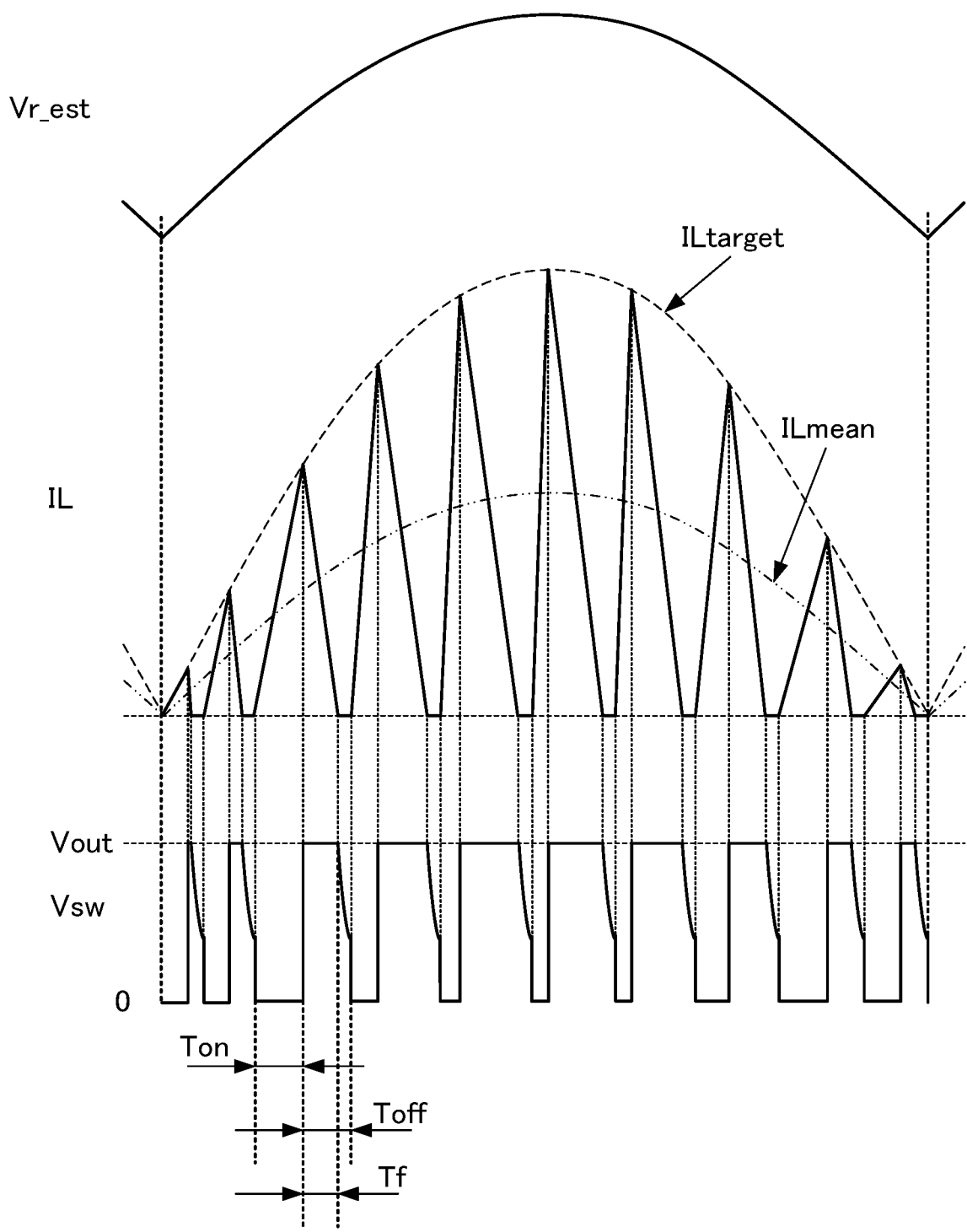
FIG. 8 is a diagram for explaining a method of estimating a rectified voltage Vrec and a method of calculating an inductance value L.

FIG. 8 is a diagram for explaining a method of estimating the voltage Vrec and a method of calculating the inductance value L.

As can be understood with reference to FIG. 8, in the case of the switching control circuit 42b, the AC-DC converter 10 operates as in the discontinuous mode, causing a period of time during which the inductor current IL is temporarily substantially zero. Accordingly, the formula (4) explained with reference to FIG. 4 does not hold. However, when the fall period Tf is used instead of the off period Toff, the relationship of the formula (1) is as follows.

$$ILtarget = Vrec/L \times Ton = (Vout - Vrec)/L \times Tf \quad (13)$$

The ON period Ton and a cycle obtained by adding up the ON period Ton and the fall period Tf can be expressed based on the formula (13) as follows.

$$Ton = (Vout - Vrec)/Vrec \times Tf \quad (14)$$

$$Ton + Tf = Vout/Vrec \times Tf \quad (15)$$

Accordingly, the rectified voltage Vrec is expressed as follows.

$$Vrec = Vout \times Tf/(Ton + Tf) \quad (16)$$

However, the fall period Tf is small when the target value ILtarget is small. Accordingly, it is difficult to accurately calculate the fall period Tf.

Meanwhile, the rectified voltage Vrec can be expressed by using the inductance value L of the inductor 22 as follows.

$$Vrec = L \times ILtarget/Ton \quad (17)$$

In this case, the inductance value L can be expressed as follows.

$$L = Vout/ILtarget \times Ton \times Tf/(Ton + Tf) \quad (18)$$

Accordingly, in a case where a change in the inductance value L can be substantially ignored, the inductance value L is calculated using the formula (18) by calculating the fall period Tf, which is relatively large when the target value ILtarget is large. Moreover, the use of the calculated inductance value L in the formula (17) enables estimation of the rectified voltage Vrec, without calculating the fall period Tf which is difficult to accurately calculate.

==Switching Control Circuit 42c==

Figure 9:
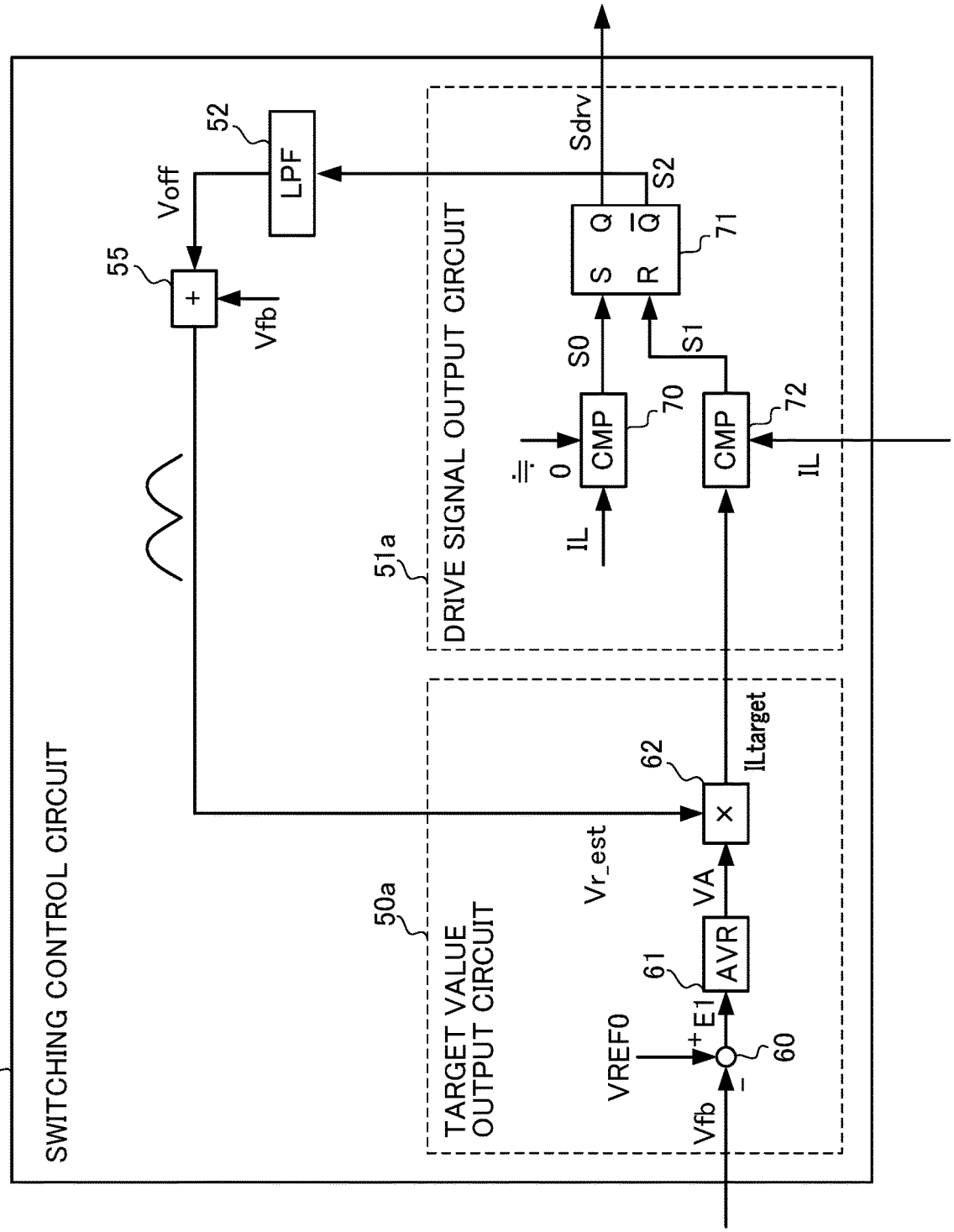
FIG. 9 is a diagram illustrating a configuration of a switching control circuit 42c.

FIG. 9 is a diagram illustrating a configuration of a switching control circuit 42c, which is one embodiment of the switching control circuit 42. Note that, in FIG. 9, parts or elements that are the same as those in FIG. 3 are given the same reference numerals, and a detailed description thereof is omitted.

The switching control circuit 42c is an embodiment in which the multiplier 53 of the switching control circuit 42a is replaced by an adder 55. As apparent from the description of FIG. 6, the output voltage Vout and the off voltage Voff change in directions opposite to each other. Accordingly, the estimation value Vr_est obtained by adding up the feedback voltage Vfb and the off voltage Voff with the adder 55 contains no ripple component ΔVout of the output voltage Vout. Accordingly, the adder 55 adds up the output voltage Vout and the off voltage Voff, which is the output of the LPF 52, and removes the ripple component ΔVout of the output voltage Vout. Note that the adder 55 corresponds to the "removal circuit".

==Switching Control Circuit 42d==

Figure 10:
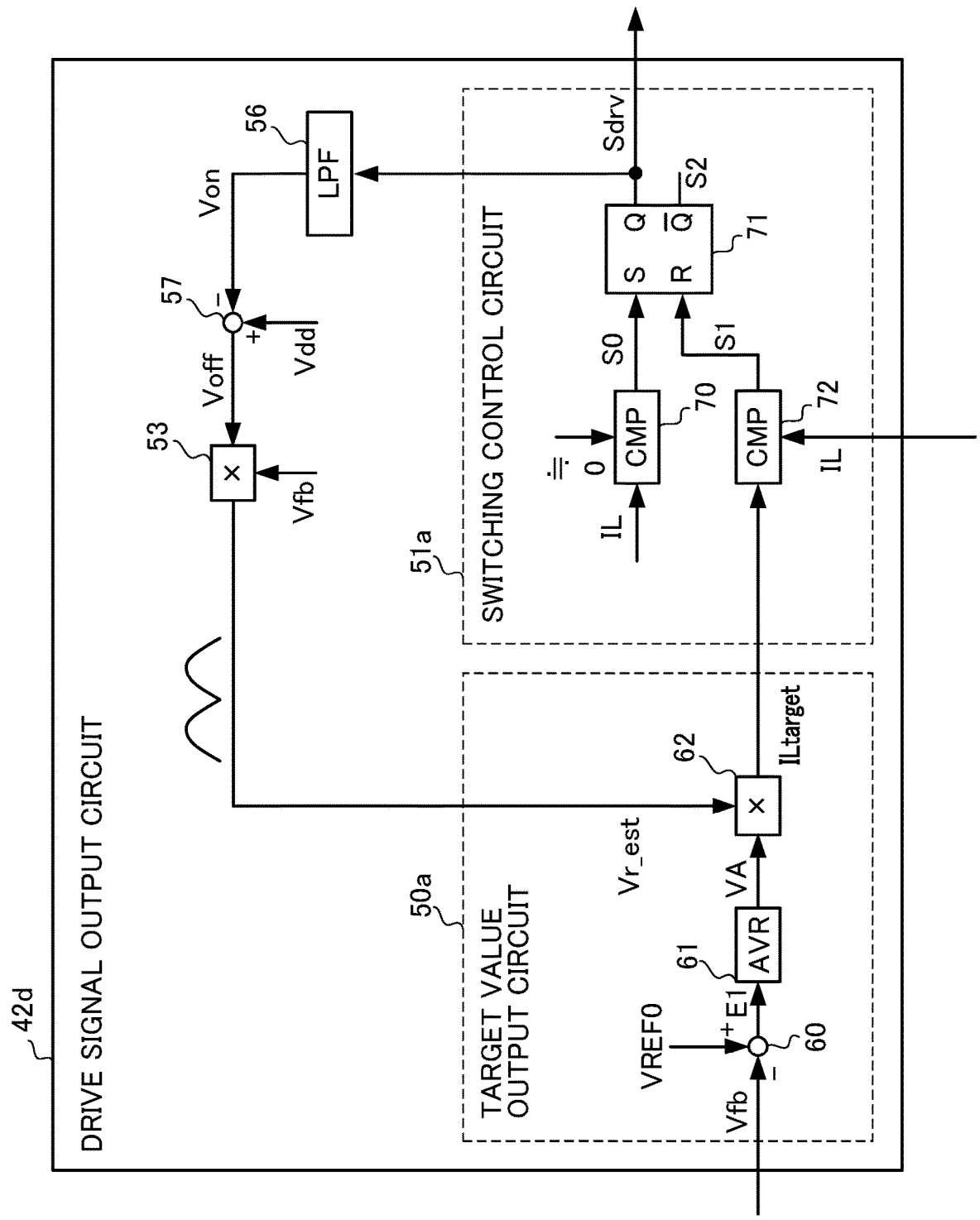
FIG. 10 is a diagram illustrating a configuration of a switching control circuit 42d.

FIG. 10 is a diagram illustrating a configuration of a switching control circuit 42d, which is one embodiment of the switching control circuit 42. Note that, in FIG. 10, parts or elements that are the same as those in FIG. 3 are given the same reference numerals, and a detailed description thereof is omitted.

The switching control circuit 42d is different from the switching control circuit 42a in that the off voltage Voff is outputted by using an LPF 56 and a subtractor 57. Specifically, the LPF 56 smooths or integrates the drive signal Sdrv and outputs the on voltage Von. The subtractor 57 subtracts the on voltage Von from an internal power supply Vdd (which will be a power supply voltage of the switching control circuit 42d) outputted from a power supply circuit (not illustrated), and outputs the off voltage Voff. Note that the LPF 56 and the subtractor 57 correspond to the "estimation circuit" or the "integration circuit".

Modified Example

<<<AC-DC Converter 12>>>

Figure 11:
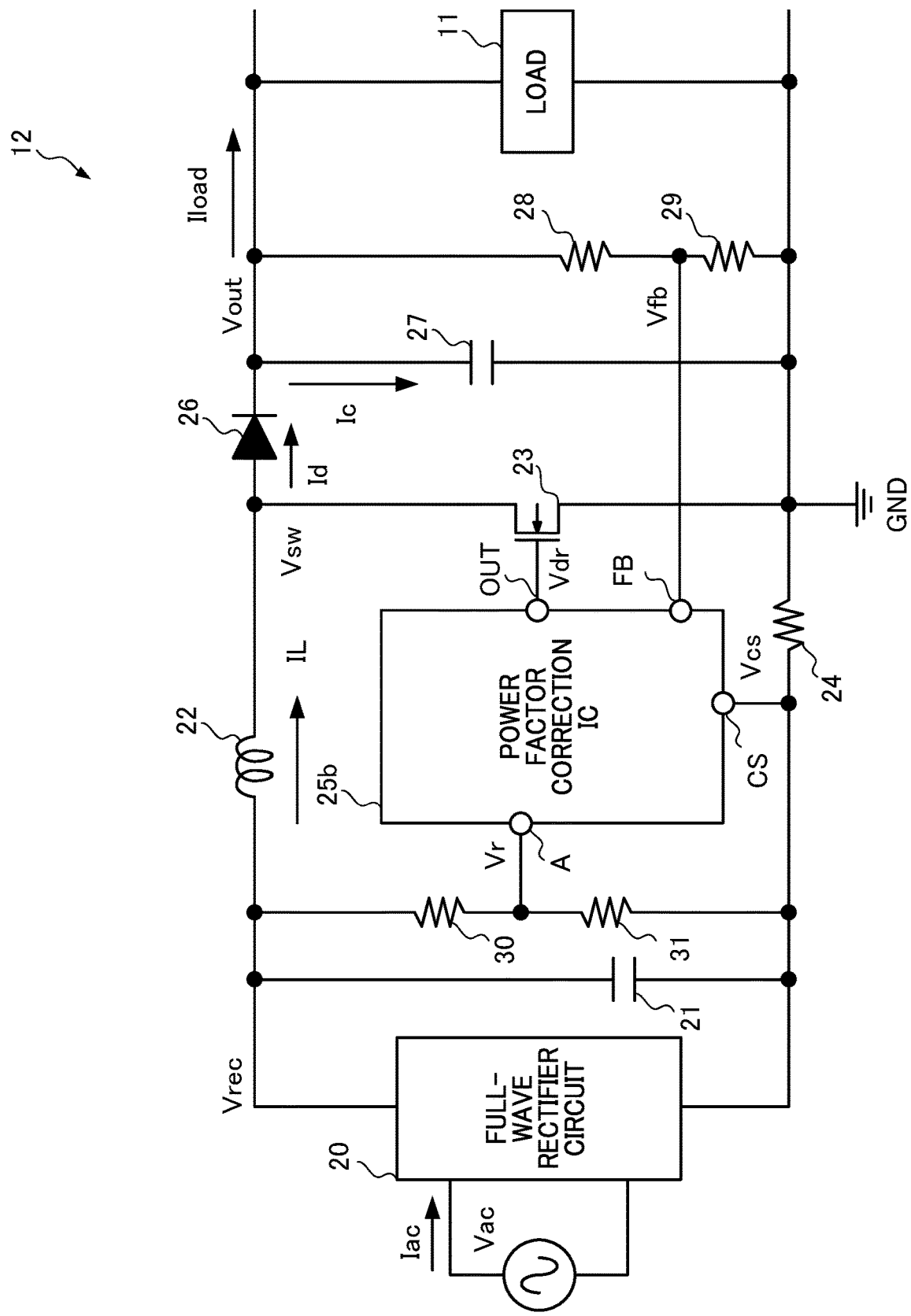
FIG. 11 is a diagram illustrating an example of an AC-DC converter 12.

FIG. 11 is a diagram illustrating one example of a configuration of an AC-DC converter 12, which is one embodiment of the present disclosure. Note that, in FIG. 11, parts or elements that are the same as those in FIG. 1 are given the same reference numerals, and a detailed description thereof is omitted.

The AC-DC converter 12 includes resistors 30 and 31 constituting a voltage divider circuit that divides the rectified voltage Vrec and outputs a resultant voltage as a voltage Vr.

Note that a power factor correction IC 25*b* further has a terminal A to receive the voltage Vr.

==Configuration of Power Factor Correction IC 25*b*==

Figure 12:
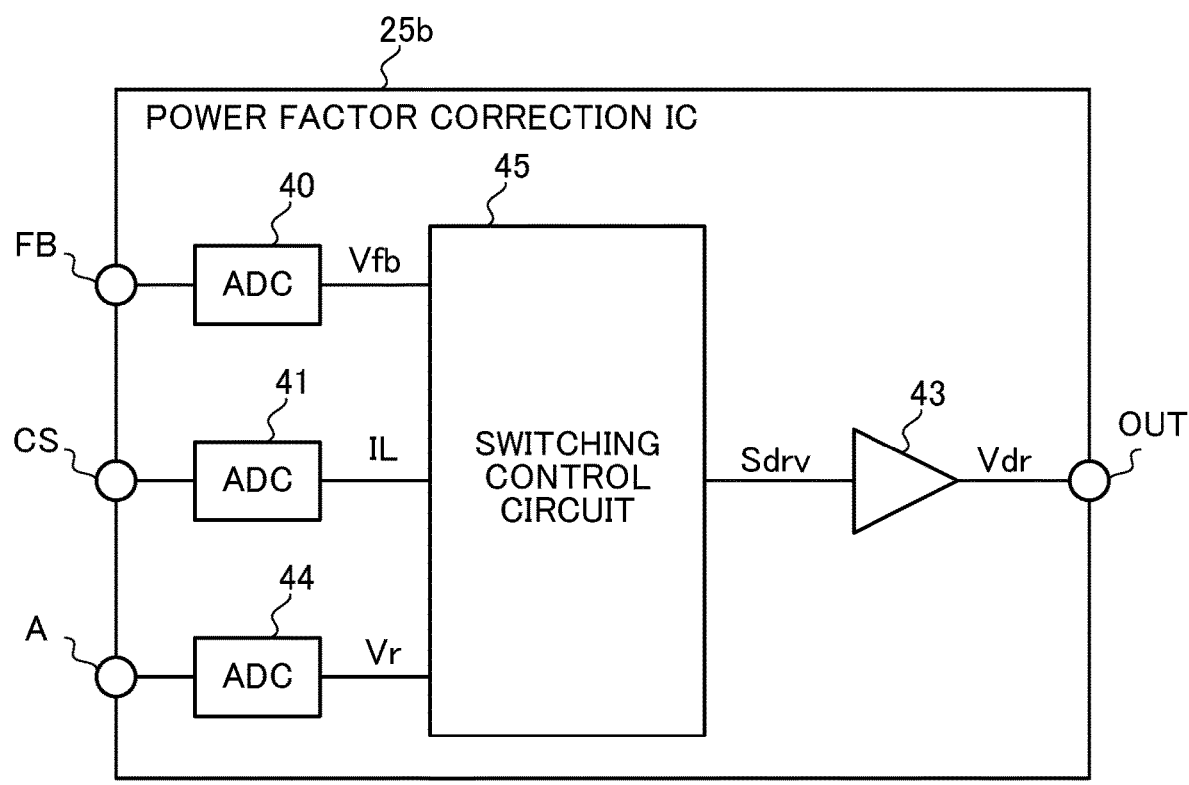
FIG. 12 is a diagram illustrating a configuration of a power factor correction IC 25b.

FIG. 12 is a diagram illustrating a configuration of the power factor correction IC 25*b*, which is one embodiment of the power factor correction IC 25. Note that, in FIG. 12, parts or elements that are the same as those in FIG. 2 are given the same reference numerals, and a detailed description thereof is omitted.

The power factor correction IC 25*b* includes analog-to-digital converters (AD converters, ADCs) 40, 41, and 44, a switching control circuit 45, and the buffer circuit 43. The AD converter 44 converts the voltage Vr to a digital value. The switching control circuit 45 outputs the drive signal Sdrv based on the feedback voltage Vfb, the inductor current IL, and the voltage Vr.

==Switching Control Circuit 45==

Figure 13:
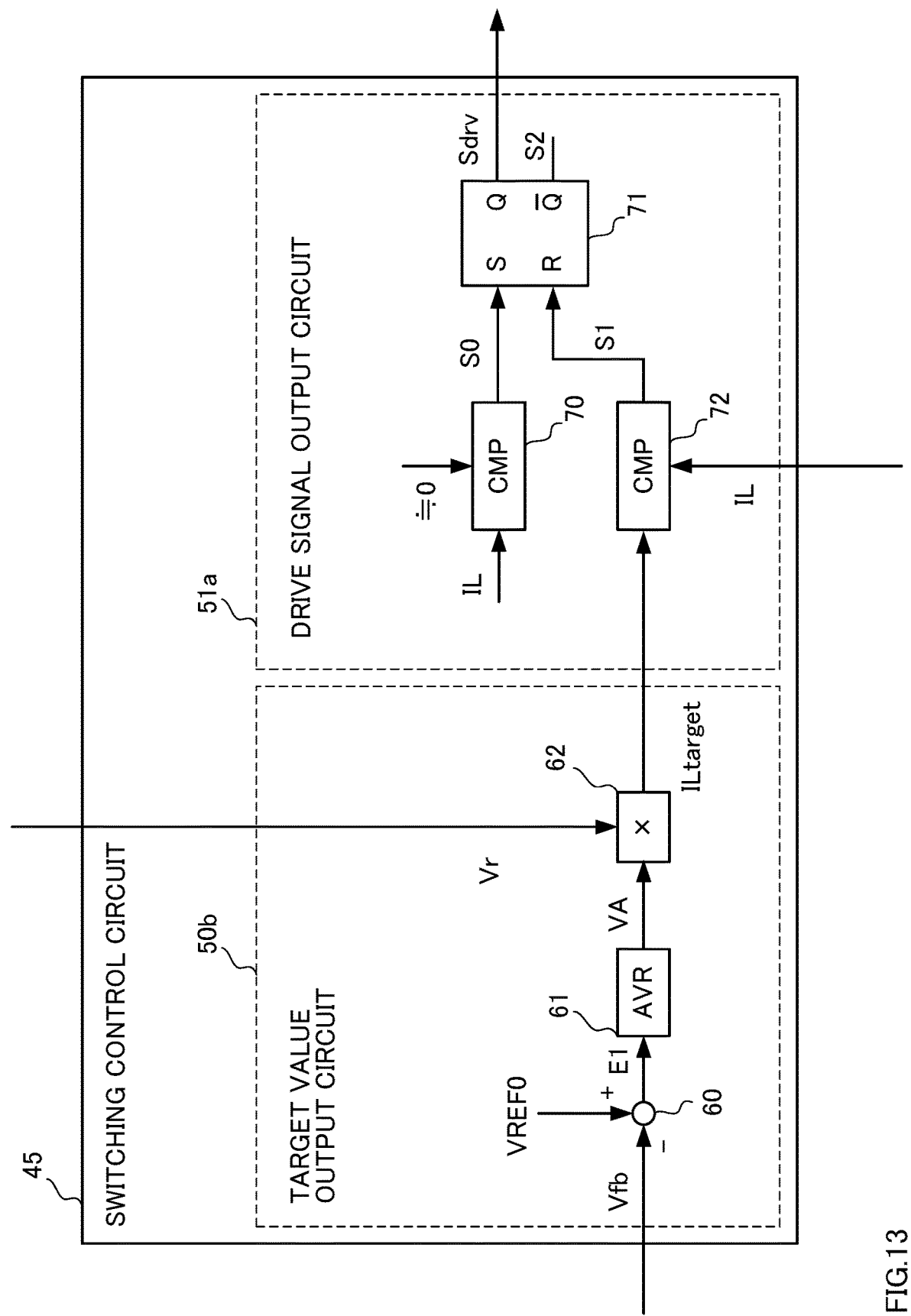
FIG. 13 is a diagram illustrating a configuration of a switching control circuit 45.

FIG. 13 is a diagram illustrating a configuration of the switching control circuit 45. Note that, in FIG. 13, parts or elements that are the same as those in FIG. 3 are given the same reference numerals, and a detailed description thereof is omitted.

The switching control circuit 45 is different from the switching control circuit 42*a* in that a target value output circuit 50*b* outputs the target value ILtarget based on the voltage Vr instead of the estimation value Vr_est.

SUMMARY

The AC-DC converters 10 and 12 according to embodiments of the present disclosure have been described above. The switching control circuits 42 and 45 each include the target value output circuit 50*a* or 50*b* and the drive signal output circuit 51*a*. The target value output circuits 50*a* and 50*b* each output the target value ILtarget based on the output voltage Vout and the estimation value Vr_est or the voltage Vr. Moreover, the drive signal output circuit 51*a* outputs the drive signal to turn on the NMOS transistor 23 upon the inductor current IL falling below the predetermined value and to turn off the NMOS transistor 23 upon the peak value of the inductor current IL reaching the target value ILtarget. Accordingly, the switching control circuits 42 and 45 determine the target value ILtarget according to the output voltage Vout and determine the on time according to the target value ILtarget, without controlling the NMOS transistor 23 with a constant on time. This enables the switching control circuits 42 and 45 to improve the power factor, without being affected by a diode, an inductor, or the like in the AC-DC converters 10 and 12. Thus, a switching control circuit that improves the power factor can be provided.

Moreover, the switching control circuit 42*a* and/or the like further includes the estimation circuit that estimates the estimation value Vr_est, based on the drive signal Sdrv. This enables the switching control circuit 42*a* and/or the like to improve the power factor, without using the voltage divider circuit for obtaining the divided voltage Vr of the rectified voltage Vrec. Moreover, since no voltage divider circuit is used, no steady-state current flows in the voltage divider circuit in a standby state and the like. Thus, power loss of the AC-DC converter 10 in the standby state decreases.

Furthermore, the switching control circuit 42*a* and/or the like includes, as the estimation circuit, the LPF 52 that outputs the off voltage Voff. This makes it possible to obtain the off voltage Voff, which is the estimation value of the rectified voltage Vrec, with a simple circuit.

Moreover, the switching control circuit 42*a* and/or the like includes the multiplier 53 or the adder 55 that removes the ripple component ΔVout contained in the off voltage Voff received from the LPF 52. Thus, the estimation value Vr_est from which the effects of the ripple component ΔVout has been removed is outputted to the target value output circuit 50*a* and the like.

Furthermore, the switching control circuit 42*a* and/or the like further includes the multiplier 53 that removes the ripple component ΔVout of the output voltage Vout, as the removal circuit. This makes it possible to remove the ripple component ΔVout of the output voltage Vout contained in the off voltage Voff.

Moreover, the switching control circuit 42*a* and/or the like further includes, as the removal circuit, the adder 55 that removes the ripple component ΔVout of the output voltage Vout. This makes it possible to remove the ripple component ΔVout of the output voltage Vout contained in the off voltage Voff.

Furthermore, the switching control circuit 42*b* further includes a delay circuit that turns on the NMOS transistor 23 when and the predetermined period of time has elapsed since the inductor current IL has fallen below the predetermined value. This enables the switching control circuit 42*b* to reduce the switching loss of the NMOS transistor 23.

Moreover, the switching control circuit 42*b* further includes the estimation circuit that estimates the estimation value Vr_est of the rectified voltage Vrec based on the ON period Ton, the fall period Tf, and the output voltage Vout. This enables the switching control circuit 42*b* to improve the power factor, without using the voltage divider circuit for obtaining the divided voltage Vr of the rectified voltage Vrec. Moreover, since no voltage divider circuit is used, no steady-state current flows in the voltage divider circuit in the standby state and the like. Thus, the power loss of the AC-DC converter 10 in the standby state decreases.

Furthermore, the switching control circuits 42 and 45 each include the target value output circuit 50*a* or 50*b* and the drive signal output circuit 51*a*. The target value output circuit 50*a* and 50*b* each output the target value ILtarget based on the output voltage Vout and the estimation value Vr_est or the voltage Vr. Moreover, the drive signal output circuit 51*a* outputs the drive signal to turn on the NMOS transistor 23 upon the inductor current IL falling below the predetermined value, and to turn off the NMOS transistor 23 upon the peak value of the inductor current IL reaching the target value ILtarget. Furthermore, the target value ILtarget has the same cycle and the same phase as those of the AC voltage Vac, respectively, and the amplitudes of the target value ILtarget and the rectified voltage Vrec have a proportional relationship. Accordingly, the switching control circuits 42 and 45 determine the target value ILtarget according to the output voltage Vout and determine the on time according to the target value ILtarget, without controlling the NMOS transistor 23 with a constant on time. This enables the switching control circuits 42 and 45 to improve the power factor, without being affected by a diode, an inductor, or the like in the AC-DC converters 10 and 12.

Moreover, the switching control circuit 42*a* and/or the like further includes the estimation circuit that estimates the estimation value Vr_est, based on the drive signal Sdrv. This enables the switching control circuit 42*a* and/or the like to improve the power factor, without using the voltage divider circuit for obtaining the divided voltage Vr of the rectified voltage Vrec. Moreover, since no voltage divider circuit is used, no steady-state current flows in the voltage divider circuit in the standby state and the like. Thus, power loss of the AC-DC converter 10 in the standby state decreases.

Furthermore, the switching control circuit 42a and/or the like includes, as the estimation circuit, the LPF 52 that outputs the off voltage Voff. This makes it possible to obtain the off voltage Voff, which is the estimation value of the rectified voltage Vrec, with a simple circuit.

Moreover, the switching control circuit 42a and/or the like includes the multiplier 53 or the adder 55 that removes the ripple component ΔVout contained in the off voltage Voff received from the LPF 52. Thus, the estimation value Vr_est from which the effects of the ripple component ΔVout has been removed is outputted to the target value output circuit 50a and the like.

Furthermore, the switching control circuit 42a and/or the like further includes, as the removal circuit, the multiplier 53 that removes the ripple component ΔVout of the output voltage Vout. This makes it possible to remove the ripple component ΔVout of the output voltage Vout contained in the off voltage Voff.

Moreover, the switching control circuit 42a and/or the like further includes, as the removal circuit, the adder 55 that removes the ripple component ΔVout of the output voltage Vout. This makes it possible to remove the ripple component ΔVout of the output voltage Vout contained in the off voltage Voff.

Furthermore, the switching control circuit 42b further includes a delay circuit that turns on the NMOS transistor 23 when the predetermined period of time has elapsed since the inductor current IL has fallen below the predetermined value. Thus, the switching control circuit 42b can reduce the switching loss of the NMOS transistor 23.

Moreover, the switching control circuit 42b further includes the estimation circuit that estimates the estimation value Vr_est of the rectified voltage Vrec based on the ON period Ton, the fall period Tf, and the output voltage Vout. This enables the switching control circuit 42b to improve the power factor, without using the voltage divider circuit for obtaining the divided voltage Vr of the rectified voltage Vrec. Moreover, since no voltage divider circuit is used, no steady-state current flows in the voltage divider circuit in the standby state and the like. Thus, the power loss of the AC-DC converter 10 in the standby state decreases.

The present disclosure can provide a switching control circuit capable of improving the power factor.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. A switching control circuit for a power supply circuit that generates an output voltage from an alternating-current (AC) voltage inputted thereto, the power supply circuit including
a rectifier circuit configured to rectify the AC voltage,
an inductor configured to receive a rectified voltage from the rectifier circuit, and
a transistor configured to control an inductor current flowing through the inductor,
the switching control circuit being configured to control switching of the transistor, based on the inductor current and the output voltage, the switching control circuit comprising:
a target value output circuit configured to output a target value of a peak value of the inductor current;
a drive signal output circuit configured to output a drive signal to
turn on the transistor upon the inductor current falling below a predetermined value, and
turn off the transistor upon the peak value of the inductor current reaching the target value; and
an estimation circuit configured to estimate an estimation value of the rectified voltage, by smoothing, with a low pass filter, the drive signal over a period of time during which the transistor is off, wherein
the target value output circuit outputs the target value, based on the output voltage and the estimation value.

2. The switching control circuit according to claim 1, further comprising a removal circuit configured to remove a ripple component of the estimation value, based on the output voltage.

3. The switching control circuit according to claim 2, wherein the removal circuit is a multiplier configured to multiply an output of the estimation circuit and the output voltage, to thereby remove the ripple component.

4. The switching control circuit according to claim 2, wherein the removal circuit is an adder configured to add up an output of the estimation circuit and the output voltage, to thereby remove the ripple component.

5. The switching control circuit according to claim 1, wherein the drive signal output circuit further includes a delay circuit configured to turn on the transistor, when a predetermined period of time has elapsed since the inductor current has fallen below the predetermined value.

6. The switching control circuit according to claim 1, wherein the target value output circuit is configured to output the target value, to thereby shape a waveform of the peak value to be similar to a waveform of the rectified voltage.

7. A power factor correction circuit configured to generate an output voltage from an alternating-current (AC) voltage inputted thereto, the power factor correction circuit comprising:
a rectifier circuit configured to rectify the AC voltage;
an inductor configured to receive a rectified voltage from the rectifier circuit;
a transistor configured to control an inductor current flowing through the inductor; and
a switching control circuit configured to control switching of the transistor, based on the inductor current and the output voltage, the switching control circuit including
a target value output circuit configured to output a target value of a peak value of the inductor current,
a drive signal output circuit configured to output a drive signal to
turn on the transistor upon the inductor current falling below a predetermined value, and
turn off the transistor upon the peak value of the inductor current reaching the target value, and
an estimation circuit configured to estimate an estimation value of the rectified voltage, by integrating the drive signal over a period of time during which the transistor is off, wherein
the target value output circuit outputs the target value based on the output voltage and the estimation value.

8. The power factor correction circuit according to claim 7, wherein the target value output circuit is configured to output the target value, to thereby shape a waveform of the peak value to be similar to a waveform of the rectified voltage.

9. The switching control circuit according to claim 7, further comprising a removal circuit configured to remove a ripple component of the estimation value, based on the output voltage.

10. The switching control circuit according to claim 9, wherein the removal circuit is a multiplier configured to multiply an output of the estimation circuit and the output voltage, to thereby remove the ripple component.

11. The switching control circuit according to claim 9, wherein the removal circuit is an adder configured to add up an output of the estimation circuit and the output voltage, to thereby remove the ripple component.

12. A switching control circuit for a power supply circuit that generates an output voltage from an alternating-current (AC) voltage inputted thereto, the power supply circuit including
a rectifier circuit configured to rectify the AC voltage,
an inductor configured to receive a rectified voltage from the rectifier circuit, and
a transistor configured to control an inductor current flowing through the inductor,
the switching control circuit being configured to control switching of the transistor, based on the inductor current and the output voltage, the switching control circuit comprising:
a target value output circuit configured to output a target value of a peak value of the inductor current; and
a drive signal output circuit configured to output a drive signal to
turn on the transistor upon the inductor current falling below a predetermined value, and
turn off the transistor upon the peak value of the inductor current reaching the target value,
an estimation circuit configured to estimate an estimation value of the rectified voltage, based on the drive signal, wherein the target value output circuit outputs the target value, based on the output voltage and the estimation value, and
a removal circuit configured to remove a ripple component of the estimation value, based on the output voltage.

13. The switching control circuit according to claim 12, wherein the estimation circuit is an integration circuit configured to integrate the drive signal over a period of time during which the transistor is off.

14. The switching control circuit according to claim 12, wherein the removal circuit is a multiplier configured to multiply an output of the estimation circuit and the output voltage, to thereby remove the ripple component.

15. The switching control circuit according to claim 12, wherein the removal circuit is an adder configured to add up an output of the estimation circuit and the output voltage, to thereby remove the ripple component.

16. The switching control circuit according to claim 12, wherein the drive signal output circuit further includes a delay circuit configured to turn on the transistor when a predetermined period of time has elapsed since the inductor current has fallen below the predetermined value.

17. The switching control circuit according to claim 12, wherein the target value output circuit is configured to output the target value, to thereby shape a waveform of the peak value to be similar to a waveform of the rectified voltage.

18. The switching control circuit according to claim 12, wherein
the target value has a same cycle and a same phase as those of the AC voltage, respectively, and
amplitudes of the target value and the AC voltage have a proportional relationship.

* * * * *